(12) United States Patent
Nguyen et al.

(10) Patent No.: US 6,833,983 B2
(45) Date of Patent: Dec. 21, 2004

(54) CURRENT LIMITING SUPER CAPACITOR CHARGER

(75) Inventors: Don J. Nguyen, Portland, OR (US); Thovane Solivan, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 96 days.

(21) Appl. No.: 10/074,576

(22) Filed: Feb. 11, 2002

(65) Prior Publication Data

US 2003/0151875 A1 Aug. 14, 2003

(51) Int. Cl.$^7$ .................................................. H02H 7/00
(52) U.S. Cl. ............................................. 361/15; 361/18
(58) Field of Search .................. 361/15, 17, 91.1–91.8, 361/18, 93.8, 93.9, 91

(56) References Cited

U.S. PATENT DOCUMENTS

| | | | | |
|---|---|---|---|---|
| 4,482,885 A | * | 11/1984 | Mochida | 340/457 |
| 4,868,826 A | * | 9/1989 | Smith et al. | 714/10 |
| 5,105,330 A | * | 4/1992 | Hiwada | 361/225 |
| 5,228,011 A | * | 7/1993 | Owen | 367/147 |
| 5,534,788 A | * | 7/1996 | Smith et al. | 324/771 |
| 5,629,608 A | * | 5/1997 | Budelman | 323/268 |
| 5,761,019 A | * | 6/1998 | Kroll | 361/58 |
| 5,815,356 A | * | 9/1998 | Rodriguez et al. | 361/91.6 |
| 5,883,495 A | * | 3/1999 | Smith et al. | 320/128 |
| 6,044,472 A | * | 3/2000 | Crohas | 713/300 |
| 6,064,176 A | * | 5/2000 | Odaka | 320/106 |
| 6,169,389 B1 | * | 1/2001 | Chen | 320/166 |
| 6,292,341 B1 | * | 9/2001 | Milanesi et al. | 361/79 |
| 6,373,152 B1 | * | 4/2002 | Wang et al. | 307/150 |
| 6,487,059 B2 | * | 11/2002 | Bontempo et al. | 361/90 |
| 6,628,107 B1 | * | 9/2003 | Bang et al. | 323/266 |
| 2002/0000758 A1 | * | 1/2002 | Song et al. | 307/116 |

* cited by examiner

Primary Examiner—Stephen W. Jackson
Assistant Examiner—Danny Nguyen
(74) Attorney, Agent, or Firm—Robert A. Diehl

(57) ABSTRACT

According to one embodiment, a system is disclosed. The system includes a battery, a super-capacitor (SC) coupled in parallel to the battery, a computer system coupled to the battery and the SC, and a current limiter coupled to the battery the SC and the computer system. The current limiter prevents excess current from flowing from the battery to the SC.

12 Claims, 4 Drawing Sheets

CURRENT LIMITING SUPER CAPACITOR CHARGER

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

The present invention relates to computer systems; more particularly, the present invention relates to delivering power to a mobile computer system.

BACKGROUND

In the past several years, mobile computer systems, such as notebook computers, have become prevalent. Mobile computer systems enable a user to access the system in remote locations by using one of various types of batteries to deliver power to the system. Ordinarily, mobile computer systems use very little power.

However, at various times, a system component (e.g., a processor, hard drive, etc.) turn on from a low power state to a high power state in a very short time interval. Such occurrences may cause transient currents to travel back to the battery source, which may cause a dip in the battery voltage. A dip in the battery voltage may cause an under-voltage protection mechanism in the computer system to be activated. The under-voltage protection mechanism causes the computer system to shut down.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

A mechanism to limit the current flow to a super-capacitor is described. In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
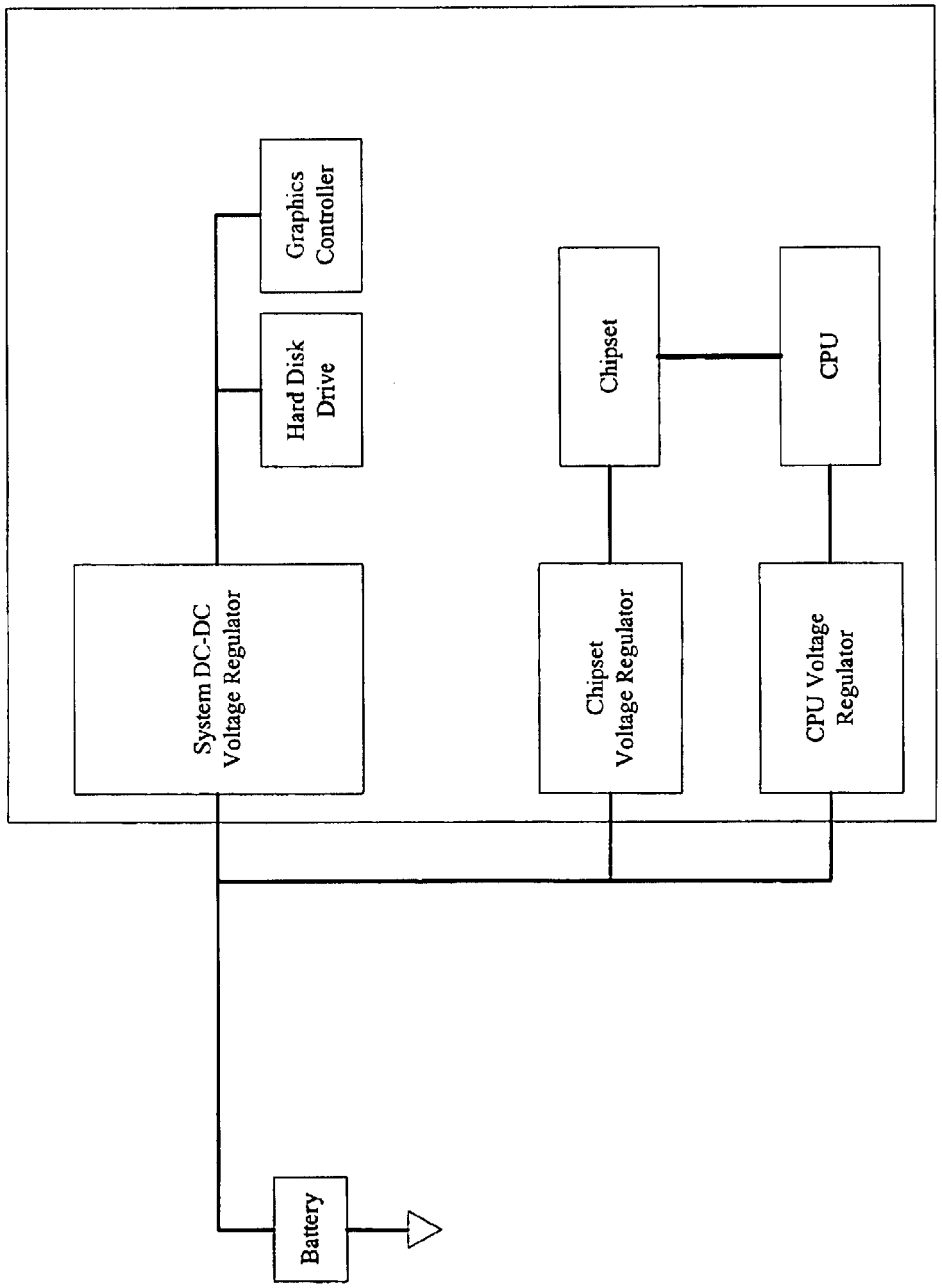
FIG. 1 illustrates a conventional power delivery system for mobile computer system.

FIG. 1 illustrates a conventional power delivery system for a mobile computer system. The power delivery system includes a battery source coupled to a computer system. The computer system includes a system voltage regulator, a chipset voltage regulator, and a central processing unit (CPU) voltage regulator. The system voltage regulator regulates voltage for various hardware components (e.g., a hard disk drive, graphics controller, memory, etc.). The chipset and voltage regulators regulate voltage for a chipset and CPU, respectively.

As described above, current transients may occur whenever a hardware component coupled to one of the regulators is activated from a low power state to a high power state in a very short time interval. Often, the transients reflect back to the input of an associated voltage regulator. In such an instance, the transient currents travel back to the battery source, which may cause a dip in the battery voltage.

As discussed above, a dip in the battery voltage may cause an under-voltage protection mechanism in the computer system to be activated. The under-voltage protection mechanism causes the computer system to shut down. According to one embodiment, a super-capacitor (SC) is placed in parallel to the computer system battery.

Figure 2:
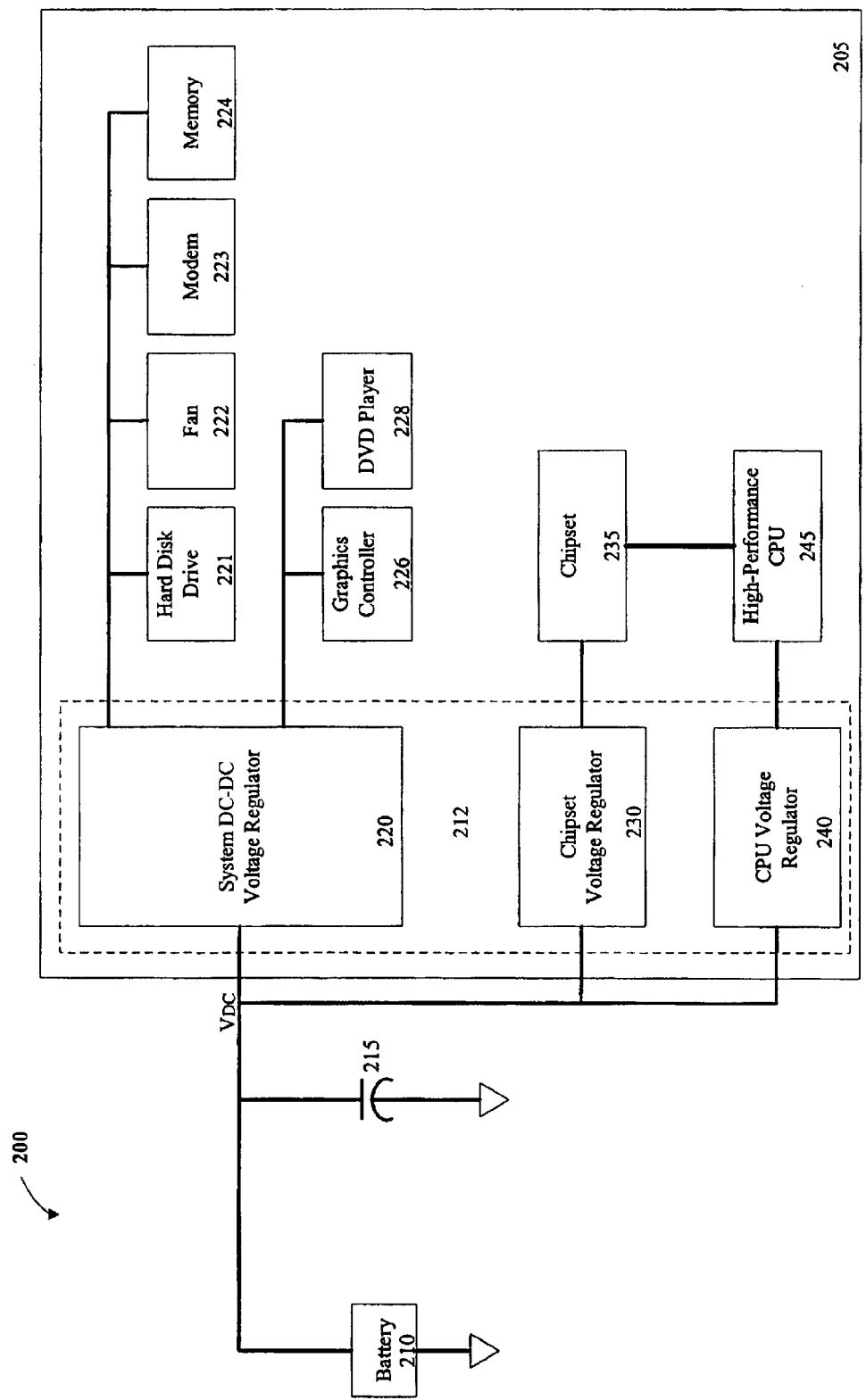
FIG. 2 illustrates one embodiment of a power delivery system for a mobile computer system.

FIG. 2 illustrates one embodiment of a power delivery system 200. Power delivery system 200 includes computer system 205, battery 210, and SC 215. Computer system 205 includes a power delivery subsection 212. Power delivery subsection 212 includes a system voltage regulator 220, a chipset voltage regulator 230, and a CPU voltage regulator 240.

Voltage regulator 220 regulates voltage for various hardware components within computer system 200. In particular, voltage regulator 220 produces a relatively constant voltage output signal (e.g., 5 VDC) from a received voltage between (8–12 VDC), depending upon the charge of battery 210. The system components include a hard disk drive 221, a cooling fan 222, a modem 223, one or more memory devices 224, a graphics controller 226 and a digital video disk (DVD) player 228.

Voltage regulator 230 regulates the voltage for a chipset 235 coupled to regulator 230. Similarly, voltage regulator 240 regulates the voltage for a high performance CPU 245 coupled to regulator 240. One of ordinary skill in the art will appreciate that additional components may be coupled to voltage regulators 220, 230 and 240.

Battery 210 is coupled to computer system 205. Battery 210 is an electrochemical cell (or enclosed and protected material) that can be charged electrically to provide a static potential for power or released electrical charge. In one embodiment, battery 210 provides a 12 $V_{DC}$ voltage when fully charged, and an 8 $V_{DC}$ voltage once computer system 205 has discharged battery 210. In a further embodiment, battery 210 is a Nickel-Metal Hydride (Ni—MH) battery. However, in other embodiments, battery 210 may be a Lithium Ion (Li—Ion) battery or a Nickel-Cadmium (Ni—Cd) battery.

SC 215 is coupled to computer system 205 in parallel with battery 215. According to one embodiment. SC 215 has a capacitance of 20 farad, and a resistance of 5 milliohms. Since the internal impedance of SC 215 is much lower than the impedance of battery 210, and the parasitic behavior of computer system 205 power delivery subsections to SC 215 is smaller than that to battery 210, the system transient will be suppressed In SC 216. As a result, voltage drops at battery 210 that are attributed to transients are prevented.

However, the low-impedance characteristic of SC 215 may trigger a condition that can cause the battery to run into an over-current discharge condition. One example of such an over-current discharge condition may occur when computer system 205 has completely discharged battery 210 and SC 215. Typically, the voltage on discharged battery 210 is approximately 8V.

However, once a fully charged battery pack 210 (e.g., 12.5V) is inserted into computer system 205 to replace the discharged battery 210, the charged battery 210 will attempt to recharge SC 215 to the same 12.5V voltage potential with as much current that is allowed. The only limitation to the current flow is the impedance of battery 210, and its contact and printed circuit board resistance, and the impedance of the SC 215.

Because of the small SC 215 impedance, SC 215 will short circuit battery 210 in order to quickly equalize the voltage potential. Consequently, the resultant current flow will have an extremely high magnitude that could potentially cause the battery's internal protection circuitry to shut down the battery. Moreover, the high current could permanently damage the battery pack.

Another over-current condition may occur from SC 215 to battery 210 during charging of a battery 210. For instance, once a computer system 205 user has fully charged one battery 210 with an AC adapter recharge connection, the voltage of SC 215 may be as high as 21.0V. If the user decides to remove the first battery 210 and recharge a second battery 210, which has a voltage of approximately 8V, SC 215 will begin to rapidly deliver current to the battery 210.

Figure 3:
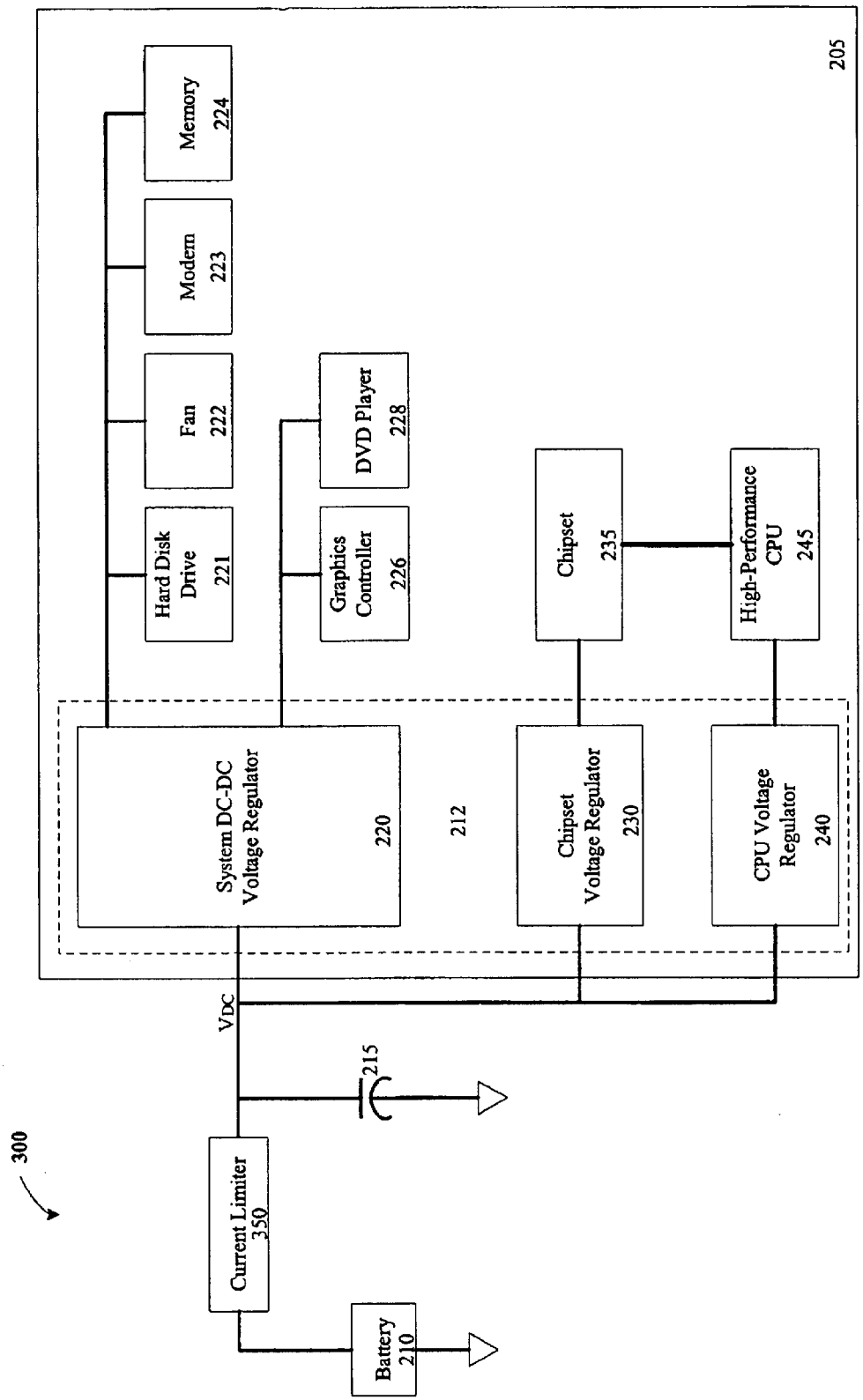
FIG. 3 illustrates another embodiment of a power delivery system for a mobile computer system.

According to one embodiment, a current limiter circuit is placed between battery 210 and SC 215 in order to limit the current between battery 210 and SC 215, and vice versa. FIG. 3 illustrates a power delivery system 300. Power delivery system 300 includes computer system 205, battery 210, and SC 215 as described in FIG. 2. In addition, system 300 includes current limiter 350. As described above, current limiter 350 limits the current between battery 210 and SC 215, and SC 215 and battery 210.

Figure 4:
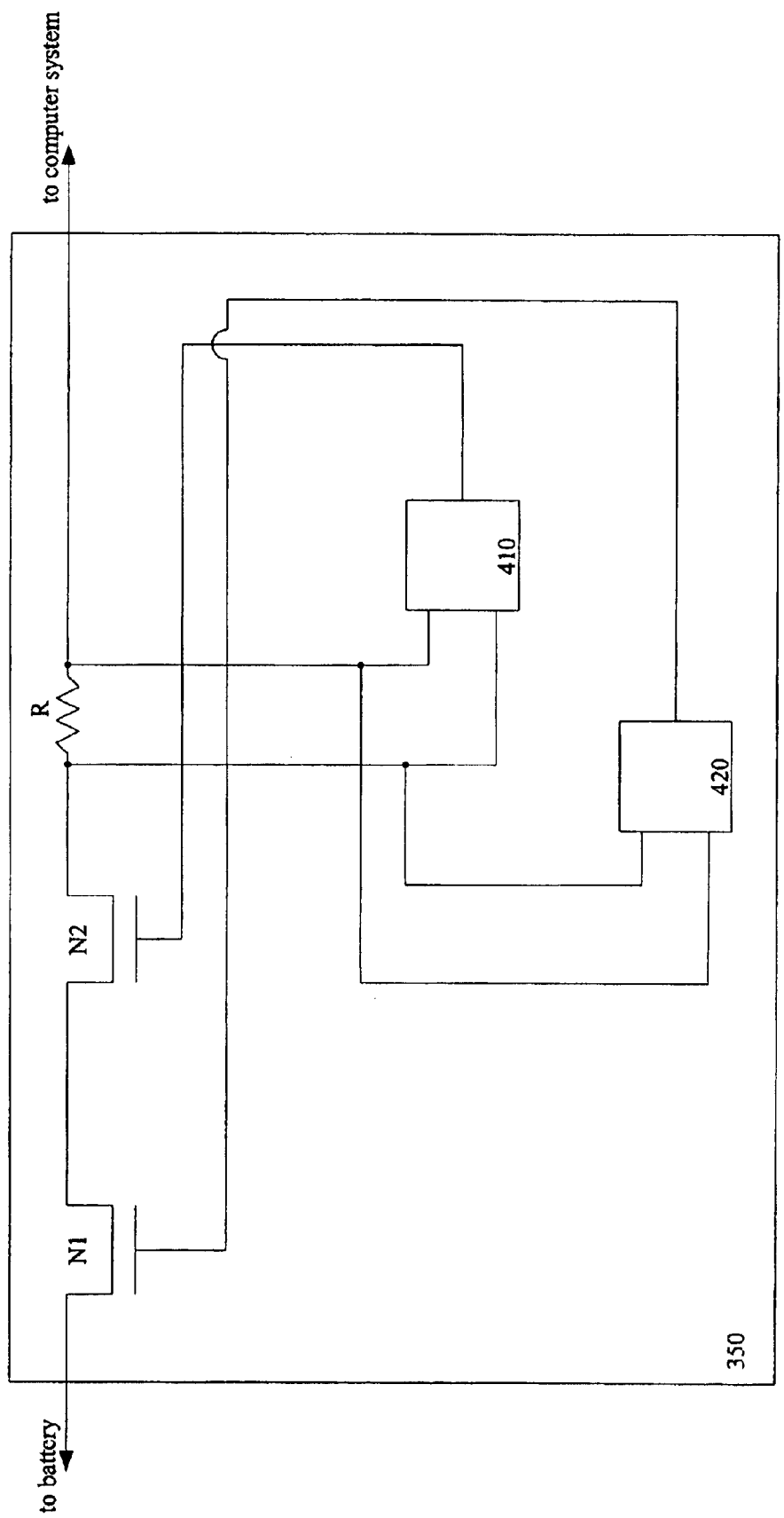
FIG. 4 illustrates one embodiment of a current limiter.

FIG. 4 illustrates one embodiment of a current limiter 350. Current limiter 350 includes NMOS transistors N1 and N2, a resistor, and comparators 410 and 420. The source of transistor N1 is coupled to battery 210, while the drain is coupled to transistor N2. The gate of transistor N1 is coupled to the output of comparator 420. The gate of transistor N2 is coupled to the output of comparator 410. The drain of transistor N2 is coupled to the resistor. The resistor is coupled to SC 215 and computer system 205.

Comparator 410 is coupled across the resistor. Comparator 410 measures the voltage across the resistor and compares the voltage to a predetermined voltage threshold. According to one embodiment, comparator 410 transmits a high logic level (e.g., logic 1) to transistor N2 during normal operation. Thus, during normal operation transistor N2 is activated and current is able to flow from battery 210 to computer system 205.

However, if the voltage across the resistor exceeds the predetermined voltage threshold, comparator 410 transmits a low logic level (e.g., logic 0) to transistor N2. As a result, transistor N2 is deactivated, and the flow of current from battery 210 to SC 215 is terminated.

Comparator 420 is also coupled across the resistor and compares the voltage to another predetermined voltage threshold. Comparator 420 transmits a high logic 1 to transistor N1 during normal operation. Consequently, during normal operation transistor N1 is activated and current is able to flow from computer system 205 to battery 210.

However, if the voltage across the resistor exceeds the predetermined voltage threshold, comparator 410 transmits a low logic level (e.g., logic 0) to transistor N1. Accordingly, transistor N1 is deactivated, and the potential flow of current from SC 215 to battery 210 is terminated.

According to one embodiment comparators 410 and 420 are operation amplifiers. However, one of ordinary skill in the art will appreciate that comparators 410 and 420 may be implemented using other types of circuit components.

The power delivery system described above prevents transient currents from traveling back to the battery of the system, which may ultimately trigger an under-voltage protection mechanism to shut down a computer system. In addition, the power delivery system prevents over-current discharge conditions from the battery to a super-capacitor in the system, and from the super-capacitor to the battery.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

What is claimed is:

1. A system comprising:
    a battery;
    a super-capacitor (SC) coupled in parallel to the battery;
    a computer system coupled to the battery and the SC; and
    a current limiter, coupled to the battery, comprising:
        a first transistor coupled to the battery;
        a second transistor coupled to, the first transistor to prevent excess current from flowing from the battery to the SC whenever the second transistor is deactivated;
        a resistor coupled to the second transistor, the SC and the computer system;
        a first comparator with inputs coupled across the resistor and an output coupled to the gate of the second transistor; and
        a second comparator with inputs coupled across the resistor and an output coupled to the gate of the first transistor.

2. The system of claim 1 wherein the current limiter prevents excess current from flowing from the SC to the battery.

3. The system of claim 1 wherein the SC prevents transients from the computer system from affecting the battery voltage.

4. The system of claim 3 wherein the SC has a capacitance of 20 farad and a resistance of 5 milliohms.

5. The system of claim 1 wherein the computer system comprises:
    a power delivery subsection; and
    a plurality of hardware components coupled to the power delivery subsection.

6. The system of claim 5 wherein the power delivery subsection comprises:
    a system voltage regulator;
    a chipset voltage regulator; and
    a central processing unit (CPU) voltage regulator.

7. The system of claim 1 wherein the first comparator deactivates the second transistor if the voltage across the resistor is greater than a first predetermined threshold.

8. The system of claim 7 wherein the second comparator deactivates the first transistor if the voltage across the resistor is greater than a second predetermined threshold.

9. A system comprising:
a battery;
a super-capacitor (SC) coupled In parallel to the battery;
a power delivery system coupled to the battery and the SC; and
a current limiter, coupled to the battery, comprising:
 a first transistor coupled to the battery;
 a second transistor coupled to the first transistor to prevent excess current from flowing from the battery to the SC whenever the second transistor is deactivated;
 a resistor coupled to the second transistor, the SC and the power delivery system;
 a first comparator with inputs coupled across the resistor and an output coupled to the gate of the second transistor; and
 a second comparator with inputs coupled across the resistor and an output coupled to the gate of the first transistor.

10. The system of claim 9 wherein the current limiter prevents excess current from flowing from the SC to the battery.

11. The system of claim 9 wherein the SC prevents transients from the computer system from affecting the battery voltage.

12. The system of claim 9 wherein the power delivery system comprises:
 a first voltage regulator; and
 a second voltage regulator.

* * * * *